United States Patent
Lin et al.

(10) Patent No.: US 12,117,898 B2
(45) Date of Patent: Oct. 15, 2024

(54) THREE-MODE STORAGE METHOD FOR PROGRAM BLOCKS BASED ON CHECK

(71) Applicants: INNOVATION ACADEMY FOR MICROSATELLITES OF CAS, Shanghai (CN); SHANGHAI ENGINEERING CENTER FOR MICROSATELLITES, Shanghai (CN)

(72) Inventors: Baojun Lin, Shanghai (CN); Yongshan Dai, Shanghai (CN); Zhichao Chen, Shanghai (CN); Xiaoli Tian, Shanghai (CN); Qianyi Ren, Shanghai (CN); Xinying Lu, Shanghai (CN); Wenbin Gong, Shanghai (CN); Yuan Shen, Shanghai (CN); Zhiyang Yu, Shanghai (CN); Bin Song, Shanghai (CN); Ruiqiang Shao, Shanghai (CN)

(73) Assignees: INNOVATION ACADEMY FOR MICROSATELLITES OF CAS, Shanghai (CN); SHANGHAI ENGINEERING CENTER FOR MICROSATELLITES, Shanghai (CN)

( * ) Notice: Subject to any disclaimer, the term of this patent is extended or adjusted under 35 U.S.C. 154(b) by 87 days.

(21) Appl. No.: 18/084,581

(22) Filed: Dec. 20, 2022

(65) Prior Publication Data
US 2023/0195562 A1    Jun. 22, 2023

(30) Foreign Application Priority Data

Dec. 20, 2021 (CN) .......................... 202111558182.0

(51) Int. Cl.
G06F 11/00 (2006.01)
G06F 11/10 (2006.01)
G06F 11/36 (2006.01)

(52) U.S. Cl.
CPC ...... *G06F 11/1004* (2013.01); *G06F 11/3644* (2013.01)

(58) Field of Classification Search
CPC . G06F 9/30029; G06F 2211/109; G06F 21/64
See application file for complete search history.

(56) References Cited

U.S. PATENT DOCUMENTS 7,024,593 B1 * 4/2006 Budd .................... H04L 1/0061
714/48
7,320,087 B2 * 1/2008 Sato .................... G06F 11/1433
717/173

(Continued)

*Primary Examiner* — Esaw T Abraham
(74) *Attorney, Agent, or Firm* — JCIPRNET

(57) ABSTRACT

The present application provides a three-mode storage method for program blocks based on check, comprising: first dividing the program to be injected into N blocks and checking each block to obtain the first checksum; then injecting the program to be injected and the first checksum twice in the program storage area, and the two injected programs are noted as the main program and the backup program, respectively; dividing the main program into N blocks, and checking each program block to obtain the second checksum during program run; dividing the backup program into N blocks and checking each block to obtain the third checksum; and comparing the checksum, second checksum and third checksum: if the three are consistent, performing no operation; updating the program or checksum and checking again, if the three are inconsistent.

14 Claims, 1 Drawing Sheet

(56) References Cited

U.S. PATENT DOCUMENTS

| | | | | |
|---|---|---|---|---|
| 7,716,555 | B2* | 5/2010 | Andou | G06F 11/1004 |
| | | | | 714/766 |
| 7,890,467 | B2* | 2/2011 | Watanabe | G06F 11/2097 |
| | | | | 707/648 |
| 9,063,664 | B1* | 6/2015 | Li | G06F 3/0641 |
| 9,471,435 | B2* | 10/2016 | Michihata | G06F 9/4401 |
| 9,830,233 | B2* | 11/2017 | Binford | G06F 11/1451 |
| 11,360,699 | B1* | 6/2022 | Zhang | G06F 3/0619 |
| 2015/0199243 | A1* | 7/2015 | Wu | G06F 11/1451 |
| | | | | 707/626 |
| 2016/0147855 | A1* | 5/2016 | Bhagat | H04L 67/1095 |
| | | | | 707/620 |
| 2016/0150012 | A1* | 5/2016 | Barszczak | G06F 16/2237 |
| | | | | 709/219 |

\* cited by examiner

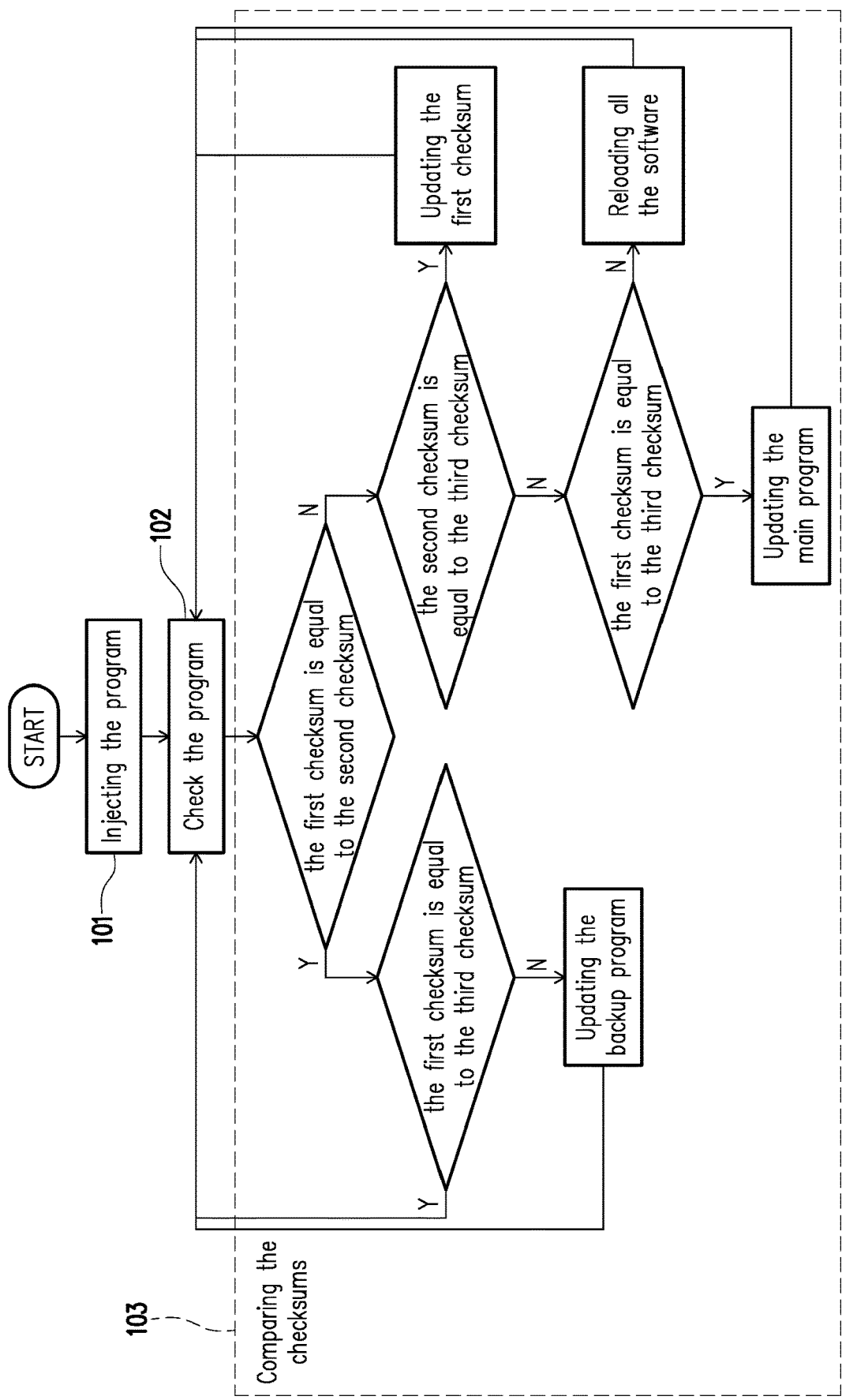

THREE-MODE STORAGE METHOD FOR PROGRAM BLOCKS BASED ON CHECK

CROSS-REFERENCE TO RELATED APPLICATION

This application claims the priority benefit of Chinese application no. 202111558182.0, filed on Dec. 20, 2021. The entirety of the above-mentioned patent application is hereby incorporated by reference herein and made a part of this specification.

BACKGROUND

Technical Field

The disclosure relates to the technical field of aerospace, specifically, to a three-mode storage method for program blocks based on check.

Description of Related Art

Radiation effect of space environmental is one of the main causes of spacecraft anomalies and malfunctions. Cosmic space is full of various forms of matter, such as plasma, charged particles of various energies, which may have harmful effects on space vehicles. Single-particle effect is one of the most typical ones. Single-particle effect is a radiation effect triggered by a single high-energy protons or heavy ions incident on electronic components, which according to the different mechanisms can be divided into: single-particle flip, lock, burn, gate breakdown, etc. Usually, the single particle effect can be improved by radiation-proof of the chip itself, radiation-proof of the vehicle itself, etc.

Commonly used single-particle protection methods include EDAC, three-mode redundancy, timed refresh, etc. Wherein the principle of EDAC is to add some check codes to the transmitted data source codes, so that the relationship between these data source codes and check codes is established according to certain rules, and when there is an error in the legal data encoding, the relationship between the data source codes and check codes is broken, forming an illegal code, and the receiver can detect errors by detecting the legality of the code until the error is corrected. Generally, aerospace-level processor has its own EDAC function, if not, it needs to be provided with additional protection measures.

The three-mode redundancy refers to the triple storage and voting of flags that have a significant impact on program operation and parameters or codes that play a key role in the operation structure. If overturned single-particle is found through three-mode voting, then the refresh procedure is started, and the overturned bit is corrected by using the three-mode voting result. This method is extremely resource-intensive and the code redundancy is more than ⅔.

The above two types of methods are commonly used to cope with in-orbit single-particle effects. Depending on the type of chip and the resource allocation, it is reasonable to choose one way for single-particle protection.

In practice, as satellites become more and more powerful, chip resource utilization almost reaches its limit. Limited by the limited resources of the aerospace-level chip, in order to achieve the complex functional performance of the satellite, it is often impossible to achieve full three-mode redundancy of the in-orbit program under the premise of considering the power consumption, heat consumption and cost of the satellite. Generally, the priority is to guarantee the three-mode redundancy of the data in the program running area and the key parameter storage area during the program design, while the code storage area, program loading and other links will be considered as a secondary priority. Therefore, when the space-grade chip itself does not have EDAC function, for the large programs running in the processor, program data and important data stored in the memory, etc., a new, more efficient and less resource-intensive method is needed instead of the traditional way that requires a lot of redundant resources to achieve EDAC or three-mode redundancy.

SUMMARY

In view of some or all of the problems in the existing technology, the present application provides a three-mode storage method for program blocks based on check, comprising:

Dividing the program to be injected into N blocks, and checking each block to obtain a first checksum;

Injecting the program to be injected and the first checksum twice in the program storage area, and the two injected programs to be injected are recorded as the main program and the backup program, respectively;

Dividing the main program into N blocks, and checking each block to obtain a second checksum during the program run;

Dividing the backup program into N blocks, and checking each block to obtain a third checksum; and Comparing the first checksum, second checksum and third checksum:

Performing no operation if all three are consistent; and

Updating the program or checksum and rechecking if the three are inconsistent.

Further, the first checksum and/or second checksum and/or third checksum is obtained by a XOR check.

Further, the XOR-check is performed every 32 bits and the first checksum and/or second checksum and/or third checksum is an array of N*32 bits.

Further, the three-mode storage method for program blocks comprising:

Checking and comparing when generating every 32-bit checksum during the program run.

Further, the main program and backup program are verified using a separate check module, respectively.

Further, the updating of the program or checksum comprising:

Comparing the main program and the backup program bit by bit and correcting the backup program according to the main program if the first checksum is equal to the second checksum but not to the third checksum;

Comparing the main program and the backup program bit by bit and correcting the main program according to the backup program if the first checksum is equal to the third checksum but not to the second checksum;

Correcting the first checksum according to the second checksum or third checksum if the second checksum is equal to the third checksum but not to the first checksum; and Reloading all the program and checking it again if the first checksum, second checksum and third checksum are not the same.

Further, the updating of the program or checksum further comprising:

Reloading check module and checking again if no difference is found when comparing the main program and the backup program bit by bit.

In another aspect, the present application also provides a satellite that uses the three-mode storage method for program blocks based on check as described previously.

The three-mode storage method for program blocks based on check provided by the present application divides the program into program blocks and checks each block, compares the checksum values of the main program, the backup program and the ground pre-calculated checksum, and then determines whether there is a single particle effect. At the same time, the method also provides real-time updating of the erroneous programs to ensure stable operation of the software in orbit, and the overall method is simple and effective. Since the program is divided into small blocks, this makes its check process and the subsequent checksum comparison operation a very small percentage of redundant resources, usually less than one thousandth. The method effectively utilizes the limited resources to complete the three-mode protection of code storage area and program loading when the chip storage resources are insufficient, which can be applied to the case of aerospace chips without EDAC and resource constraint to meet the single-particle protection design requirements of large block of program storage/data storage.

BRIEF DESCRIPTION OF THE DRAWINGS

In order to further clarify the above and other advantages and features of the embodiments of the present application, a more detailed description of the embodiments of the present application will be given with reference to the accompanying drawings. It is understood that these drawings merely serve to depict typical embodiments of the present application, and therefore should not be considered as limiting. In the drawings, for clarity, the same or corresponding components will be provided with the same or similar reference numerals.

FIGURE shows a process diagram of the three-mode storage method for program blocks based on check of the present application.

DESCRIPTION OF THE EMBODIMENTS

In the following description, the present application is described by reference to various embodiments. However, those skilled in the art will recognize that the various embodiments may be implemented without one or more specific details or with other alternative and/or additional methods, materials or components. In other cases, the public structure, material or operation is not shown or described in detail to avoid blurring the invention point of the present application. Similarly, for the purpose of interpretation, a specific quantity, material and configuration are described in order to provide a comprehensive understanding of the embodiment of the present application. However, the present application is not limited to these specific details. In addition, it is understood that the various embodiments shown in the drawings are illustrative and are not necessarily drawn to scale.

In the present application, a reference to "an embodiment" or "the embodiment" means that the particular feature, structure or characteristic described in conjunction with the embodiment is included in at least one embodiment of the present application. The wording "in one embodiment" in the present application does not necessarily refer to the same embodiment.

It should be noted that the embodiment of the present application describes the steps in a specific order, however, this is only to illustrate the specific embodiment, rather than to limit the sequence of the steps. On the contrary, in the different embodiments of the present application, the sequence of steps can be adjusted according to actual demand.

Due to the large resource consumption of three-mode redundancy, it is often difficult to carry out full three-mode redundancy for large programs running in the processor, and program data and important data stored in memory in practical applications. This makes it difficult to effectively implement single-particle protection when the aerospace-grade chip itself does not have EDAC function. Based on this, the present application proposes a three-mode storage method for program blocks based on check, which provides three-mode redundancy, check and refresh of code for a program storage area that can store only two copies of code and has no EDAC function. It divides the program into N blocks and calculates the checksum for each block and the backup program, and then compares it with the pre-calculated checksum on the ground: if the three are consistent, no operation; and if the three are not consistent, the update of the error module or checksum is achieved by taking two out of three. The scheme of the present application is further described below in conjunction with the attached drawings of the implementation.

FIGURE shows a process diagram of the three-mode storage method for program blocks based on check of the present application. As shown in FIGURE, a three-mode storage method for program blocks based on check, comprising:

Firstly, at step 101, injecting the program. Before program injection, the program to be injected is divided into N program blocks firstly, and each program block is verified to obtain a first checksum, and then the first checksum is injected into the program storage area together with the program to be stored, in embodiments of the present application, the program to be injected and the first checksum need to be injected twice in the program storage area, and the two injected programs to be injected are recorded as the main program and the backup program, respectively; in embodiments of the present application, the program block performs XOR-check every 32 bits.

Next, at step 102, the program is checked. The main program is divided into N program blocks and each program block is checked by the first check module to obtain the second checksum, diving the backup program into N program blocks and each program block is checked by the second check module to obtain the third checksum during the program run, in embodiments of the present application, in order to avoid errors in the checksum caused by single-particle knock-over, which affects the subsequent results, the code contents of the first check module and second check module are the same, but they should be implemented by occupying two separate spaces in the program, which can also be understood as being completed by two separate functions; in embodiments of the present application, each block of the main program and backup program performs XOR-check every 32 bits; and Finally, at step 103, the checksums are compared. The first checksum, the second checksum, and the third checksum are compared, and subsequent operations are performed based on the comparison results. In embodiments of the present application, if the first checksum, the second checksum and the third checksum are the same, it means that the software is running in a normal state and no single-particle event has occurred, and no operation is performed at this time; if the first checksum, the second checksum and the third checksum are inconsistent, it means that a single-particle event may occur, and it is necessary to update the program or checksum according to the specific results, specifically:

If the first checksum is equal to the second checksum but not to the third checksum, it indicates that the backup program checksum may be knocked over by a single particle, then the main program and the backup program are compared bit by bit and correct the backup program according to the main program, and if no difference is found when the main program and the backup program are compared bit by bit, then the check module is reloaded and checked again;

If the first checksum is equal to the third checksum but not to the second checksum, it indicates that the main program checksum may have been knocked over by a single particle, then the main program and the backup program are compared bit by bit and the main program is corrected according to the backup program, and if no difference is found when the main program and the backup program are compared bit by bit, then the check module is reloaded and checked again;

If the second checksum is equal to the third checksum but not to the first checksum, it indicates that the injected first checksum may be knocked over by a single particle, then the first checksum is corrected according to the second checksum or third checksum; and If the first checksum, the second checksum and the third checksum are not the same, it indicates that the program is wrong, then the entire software is reloaded and checked again.

In embodiments of the present application, during the stable operation of the satellite software, the comparison of the checksum is performed once after the completion of the check of each program block, instead of after the completion of the check of all program blocks of the main program and the backup program. Specifically, it comprises the following steps:

Firstly, the program to be injected is divided into program block 1, program block 2, program block 3, . . . , and program block N on the ground, and then XOR-check is performed on each program block by every 32 bits to obtain a set of N*32-bit checksum result array C={c1, c2, c3 c4, c5, . . . cN}, the checksum result array C will be uploaded to the program storage area in the satellite chip along with the program to be injected;

Next, the program to be injected and the checksum result array C are injected into the program storage area in the satellite chip twice;

Next, the first program in the program storage area is taken as the main program, and it is divided into main program block 1, main program block 2, main program block 3, . . . , and main program block N, and the second program in the program storage area is taken as the backup program, and it is divided into backup program block 1, backup program block 2, backup program block 3, . . . , and backup program block N, the first program checksum software module is invoked during the program run to perform a real time XOR-check for each main program block of the main program in the program storage area by every 32 bits to generate a set of N*32-bit checksum result array A={a1, a2, a3, a4, a5, . . . , aN}, during the stable operation of the satellite software, once e a 32-bit checksum ai (i=1, 2, . . . , N) is generated, the second program checksum software module is invoked to perform an XOR-check on the corresponding backup program block of the backup program in the program storage area by every 32 bits to get the corresponding 32-bit checksum result bi, and then ai, bi and the corresponding ci values, are compared to determine whether the three are the same:

If ai=bi=ci, it indicates that the software is running in a normal state and no single particle event has occurred, and no operation is performed at this time;

If ai=ci≠bi, it indicates that the backup program checksum in the program storage area may have been knocked over by a single particle, then the main program and the backup program is compared bit by bit and the backup program is corrected according to the main program, and if no difference is found when comparing bit by bit, then the first and/or second program checksum software module are reloaded and checked again after loading;

If bi=ci≠ai, it indicates that the main program checksum in the program storage area may have been knocked over by a single particle, then the main program and the backup program are compared bit by bit and correct the main program according to the backup program, and if no difference is found when compared bit by bit, the first and/or second program checksum software module are reloaded and checked again after loading;

If ai=bi≠ci, it indicates that the injected checksum data may be knocked over by a single particle, then the checksum value of ai or bi is rewritten to the storage space of ci and continue the subsequent check; and If ai, bi, ci are not the same, it indicates that the program has run flying error, then all the software is reloaded, started and checked again after loading.

The three-mode storage method for program blocks based on check provided by the present application divides the program into program blocks and checks each block, compares the checksum values of the main program, the backup program and the ground pre-calculated checksum, and then determines whether there is a single particle effect. At the same time, the method also provides real-time updating of the erroneous programs to ensure stable operation of the software in orbit, and the overall method is simple and effective. Since the program is divided into small blocks, this makes its check process and the subsequent checksum comparison operation a very small percentage of redundant resources, usually less than one thousandth. The method effectively utilizes the limited resources to complete the three-mode protection of code storage area and program loading when the chip storage resources are insufficient, which can be applied to the case of aerospace chips without EDAC and resource constraint to meet the single-particle protection design requirements of large block of program storage/data storage. Although the embodiments of the present application are described above, it should be understood that they are presented only as examples and not as limitations. It is obvious to the technical personnel in the relevant field that various combinations, variants and changes can be made without departing from the spirit and scope of the present application. Therefore, the width and scope of the present application disclosed herein shall not be limited by the sample embodiments disclosed above, but shall be defined only on the basis of the attached claim and its equivalent replacement.

What is claimed is:

1. A three-mode storage method for program blocks based on check, comprising:

Dividing, by a processor, a program for injection into N blocks and checking each block to obtain a first checksum;

Injecting, by the processor, the program for injection and the first checksum twice in a program storage area, wherein the two injected programs are recorded as a main program and a backup program, respectively;

Dividing, by the processor, the main program into N blocks and checking each block during a program run to obtain a second checksum;

Dividing, by the processor, the backup program into N blocks and checking each block to obtain a third checksum; and Comparing, by the processor, the first checksum, second checksum, and third checksum, wherein:

Performing, by the processor, no operation if all three are consistent; and

Updating, by the processor, the program or checksum if the three are inconsistent and checking again, thereby a single-particle protection design requirement of the program and the program storage area against a single-particle effect is met, wherein the single-particle effect is a radiation effect triggered by a single high-energy protons or heavy ions incident on electronic components.

2. The three-mode storage method for program blocks according to claim 1, wherein the first checksum and/or second checksum and/or third checksum are obtained by a XOR-check.

3. The three-mode storage method for program blocks according to claim 2, wherein the XOR-check is performed every 32 bits and the first checksum and/or second checksum and/or third checksum is an array of N*32 bits.

4. The three-mode storage method for program blocks according to claim 1, wherein the checksum is compared once after check of each block of the main program.

5. The three-mode storage method for program blocks according to claim 1, wherein the main program and backup program are checked by separate check modules separately.

6. The three-mode storage method for program blocks according to claim 1, wherein the updating of the program or checksum comprising:

Comparing the main program and the backup program bit by bit and correcting the backup program according to the main program, if the first checksum is equal to the second checksum but not to the third checksum;

Comparing the main program and the backup program bit by bit and correcting the main program according to the backup program, if the first checksum is equal to the third checksum but not to the second checksum;

Correcting the first checksum according to the second checksum or third checksum, if the second checksum is equal to the third checksum but not equal to the first checksum; and Reloading all the software, and running and checking it again after load, if the first checksum, second checksum and third checksum are not the same.

7. The three-mode storage method for program blocks according to claim 6, wherein the updating of the program or checksum further comprising:

Reloading check module, and checking again after load, if no difference is found when comparing the main program and the backup program bit by bit.

8. A satellite, comprising a chip employing the three-mode storage method for program blocks according to claim 1.

9. A satellite, comprising a chip employing the three-mode storage method for program blocks according to claim 2.

10. A satellite, comprising a chip employing the three-mode storage method for program blocks according to claim 3.

11. A satellite, comprising a chip employing the three-mode storage method for program blocks according to claim 4.

12. A satellite, comprising a chip employing the three-mode storage method for program blocks according to claim 5.

13. A satellite, comprising a chip employing the three-mode storage method for program blocks according to claim 6.

14. A satellite, comprising a chip employing the three-mode storage method for program blocks according to claim 7.

* * * * *